US011881071B2

(12) United States Patent
Tan et al.

(10) Patent No.: US 11,881,071 B2
(45) Date of Patent: Jan. 23, 2024

(54) BANKNOTE COLLECTION AND SEPARATION APPARATUS AND CASH RECYCLING AND HANDLING DEVICE

(71) Applicant: SHANDONG NEW BEIYANG INFORMATION TECHNOLOGY CO., LTD., Shandong (CN)

(72) Inventors: Jiawu Tan, Shandong (CN); Minghao Tao, Shandong (CN); Yong Yuan, Shandong (CN); Jiabo Xu, Shandong (CN); Qiangzi Cong, Shandong (CN)

(73) Assignee: SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 792 days.

(21) Appl. No.: 16/978,016

(22) PCT Filed: Mar. 7, 2019

(86) PCT No.: PCT/CN2019/077333
§ 371 (c)(1),
(2) Date: Sep. 3, 2020

(87) PCT Pub. No.: WO2019/174520
PCT Pub. Date: Sep. 19, 2019

(65) Prior Publication Data

US 2020/0410803 A1 Dec. 31, 2020

(30) Foreign Application Priority Data

Mar. 13, 2018 (CN) ......................... 201810206512.1

(51) Int. Cl.
*G07D 11/165* (2019.01)
*G07D 13/00* (2006.01)

(52) U.S. Cl.
CPC ........... *G07D 11/165* (2019.01); *G07D 13/00* (2013.01)

(58) Field of Classification Search
CPC ...... G07D 11/165; G07D 11/13; G07D 11/14; G07D 11/16; G07D 11/125; G07D 13/00
USPC ...................................................... 232/15–16
See application file for complete search history.

(56) References Cited

U.S. PATENT DOCUMENTS 7,380,784 B2 * 6/2008 Mizuno ................ B65H 83/025 271/220
7,722,024 B2 * 5/2010 Jeong ..................... B65H 29/52 271/3.12

(Continued)

FOREIGN PATENT DOCUMENTS

CN 101093590 A 12/2007
CN 103310535 A 9/2013

(Continued)

OTHER PUBLICATIONS

International Search Report issued by the State Intellectual Property Office of the P.R. China in connection with International Application No. PCT/CN2019/077333 dated May 30, 2019.

*Primary Examiner* — William L Miller
(74) *Attorney, Agent, or Firm* — George Likourezos; Carter, DeLuca & Farrell LLP

(57) ABSTRACT

Disclosed are a banknote stacking and separation apparatus and a cash recycling and handling device. The banknote stacking and separation apparatus includes a frame provided with a banknote accommodating space. A pickuping roller, a feeding roller and a gate roller are provided in an upper part of the banknote accommodating space, and the feeding roller and the gate roller are oppositely arranged. The banknote stacking and separation apparatus further includes a guiding plate and a guiding plate driving mechanism. The guiding plate is located in the banknote accommodating (Continued)

space and pivoted with the frame, and the guiding plate driving mechanism drives the guiding plate to rotate from a guiding position to a lifting position. The guiding plate shields the pickuping roller when the guiding plate is at the guiding position, and the guiding plate exposes the pickuping roller when the guiding plate is at the lifting position.

20 Claims, 10 Drawing Sheets

(56) References Cited

U.S. PATENT DOCUMENTS

| | | | | |
|---|---|---|---|---|
| 7,942,401 | B2 * | 5/2011 | Jeong | B65H 83/025 271/314 |
| 11,113,920 | B2 * | 9/2021 | Qu | B65H 29/00 |
| 2009/0014946 | A1 * | 1/2009 | Nagura | B65H 31/22 271/220 |
| 2011/0031673 | A1 * | 2/2011 | Sugizaki | B65H 31/02 270/32 |
| 2018/0082507 | A1 * | 3/2018 | Park | B65H 29/52 |
| 2019/0012869 | A1 * | 1/2019 | Berendes | G07D 11/13 |
| 2020/0010301 | A1 * | 1/2020 | Qu | G07D 11/18 |
| 2020/0302725 | A1 * | 9/2020 | Oh | B65H 31/10 |
| 2021/0104113 | A1 * | 4/2021 | Qu | G07D 11/165 |

FOREIGN PATENT DOCUMENTS

| | | | | |
|---|---|---|---|---|
| CN | 107123190 | A | | 9/2017 |
| CN | 107221072 | A | | 9/2017 |
| JP | 2005321920 | A | * | 11/2005 |
| JP | 2008021113 | A | | 1/2008 |
| KR | 20080022036 | A | * | 3/2008 |
| WO | 2017171312 | A1 | | 10/2017 |

* cited by examiner

BANKNOTE COLLECTION AND SEPARATION APPARATUS AND CASH RECYCLING AND HANDLING DEVICE

This application claims the priority of China patent application No. 201810206512.1 titled "Banknote stacking and separation apparatus and cash recycling and handling device", which was filed with the State Intellectual Property Office of the People's Republic of China on Mar. 13, 2018 and the entirety of which is incorporated herein by reference.

TECHNICAL FIELD

The present disclosure relates to the technical field of financial self-service facility, such as a banknote stacking and separation apparatus and cash recycling and handling device.

BACKGROUND

The bill recycling terminal is an financial self-service facility with multiple functions such as bill recycling, deposit, withdrawal, temporary storage, sorting, counting, identification of counterfeit banknote, record of banknote prefix and serial number, continuous banknote input, daily bill keeping and inquiry, and it can realize recycling of circulating banknotes of at least one denomination.

The bill recycling terminal usually includes a banknote input device, a banknote output device, a temporary storage device, an identification device, multiple cash boxes, a recovering box, and a banknote conveying device connecting the multiple devices, multiple cash boxes and the recovering box mentioned above.

In a banknote deposit operation, the banknotes are placed at the banknote input device, and then conveyed to the identification device for identification. The banknotes identified as genuine are conveyed to the temporary storage device for temporary storage; the banknotes that are identified as unidentifiable by the identification device are conveyed to the banknote output device and then taken back by a user.

When the deposit is confirmed, the banknotes temporarily stored in the temporary storage device are conveyed to the identification device again for identification; the banknotes identified as correct are input into the corresponding cash box one by one for storage; when the deposit is cancelled, the temporary storage device opens a shutter, and the user can take out the temporarily stored banknotes.

Both the temporary storage device and the cash boxes mentioned above are provided with a banknote stacking and separation apparatus respectively; the guiding plate in the relevant banknote stacking and separation apparatus is lifted by the supporting plate. Since there are multiple parts on the guiding plate, the guiding plate is heavy. When the supporting plate drives the guiding plate to lift, the guiding plate presses the banknotes on the supporting plate and affects the pickuping roller conveying banknotes towards the feeding roller, resulting in poor reliability of separating and outputting banknotes by the banknote stacking and separation apparatus.

SUMMARY

The present disclosure provides a banknote stacking and separation apparatus to solve the problem about poor reliability of the related banknote stacking and separation apparatus.

The present disclosure also provides a cash recycling and handling device to solve the problem about poor working reliability of the cash recycling and handling device due to the fact that the guiding plate presses the banknotes and affects the banknote output by the pickuping roller in the banknote stacking and separation apparatus of the related cash recycling and handling device.

In an embodiment, the present disclosure provides a banknote stacking and separation apparatus, including a frame provided with a banknote accommodating space; a pickuping roller, a feeding roller and a gate roller are provided in the upper part of the banknote accommodating space, and the feeding roller and the gate roller are oppositely arranged;

The banknote stacking and separation apparatus further includes a guiding plate and a guiding plate driving mechanism; where the guiding plate is located in the banknote accommodating space and pivoted with the frame, and the guiding plate driving mechanism is configured to drive the guiding plate to rotate from a guiding position to a lifting position; where, the guiding plate is configured to, in condition that the guiding plate is at the guiding position, shield the pickuping roller, and the guiding plate is also configured to, in condition that the guiding plate is at the lifting position, expose the pickuping roller.

In an embodiment, the present disclosure also provides a cash recycling and handling device, including a banknote stacking and separation apparatus mentioned above.

In the figure: 1'-frame; 2'-opening; 3'-feeding roller; 4'-gate roller; 5'-pickuping roller; 6'-guiding plate; 7'-conveying channel; 8'-banknote storage chamber; 9'-supporting plate; 100-banknote stacking and separation apparatus; 200-safe cabinet; 300-banknote input device; 400-banknote output device; 500-identification device; 600-banknote conveying device; 110-frame; 120-guiding plate; 130-conveying mechanism; 140-guiding plate driving mechanism; 150-supporting plate driving mechanism; 111-supporting plate;

112-base plate; 113-side wall; 114-shutter; 115-top wall; 116-U-shaped mounting frame; 117-inlet and outlet; 118-banknote accommodating space; 119-side plate; 121-arc-shaped limiting slot; 122-toothed part; 123-elastic element; 131-pickuping roller; 132-rotating shaft; 133-feeding roller; 134-gate roller; 141-driven pulley; 142-guiding gear; 143-torque limiter; 144-first transmission shaft; 151-motor; 152-transmission gear set; 153-second transmission shaft; 154-driving pulley; 155-belt; 160-banknote; 210-cash box; 10-first transmission part; 20-second transmission part; 30-driving assembly; 40-limiting slot; 50-temporary storage device.

DETAILED DESCRIPTION

The embodiments described here are only some of rather than all of the embodiments of the present disclosure. In the descriptions of the present disclosure, the directions or position relationships indicated by words such as “inside”, “upper”, “top” and “side” are based on those on the drawings, and are used only for facilitating the description of the present disclosure and for simplifying description, not for indicating or implying that the target devices or components must have a special direction and be structured and operated at the special direction, thereby they cannot be understood as the restrictions to the present disclosure. Moreover, the words “first” and “second” are used only for description, and cannot be understood as indication or implying of relative importance.

In the descriptions of the present disclosure, unless otherwise specified or restricted, the word “connection” shall be understood as a general sense. For example, the connection can be fixed connection, removable connection, integrated connection, direct connection, indirect connection through intermediate media or connection between two components. Persons of ordinary skill in the art of the invention can understand the meanings of the words above in the present disclosure according to specific situations.

Figure 1:
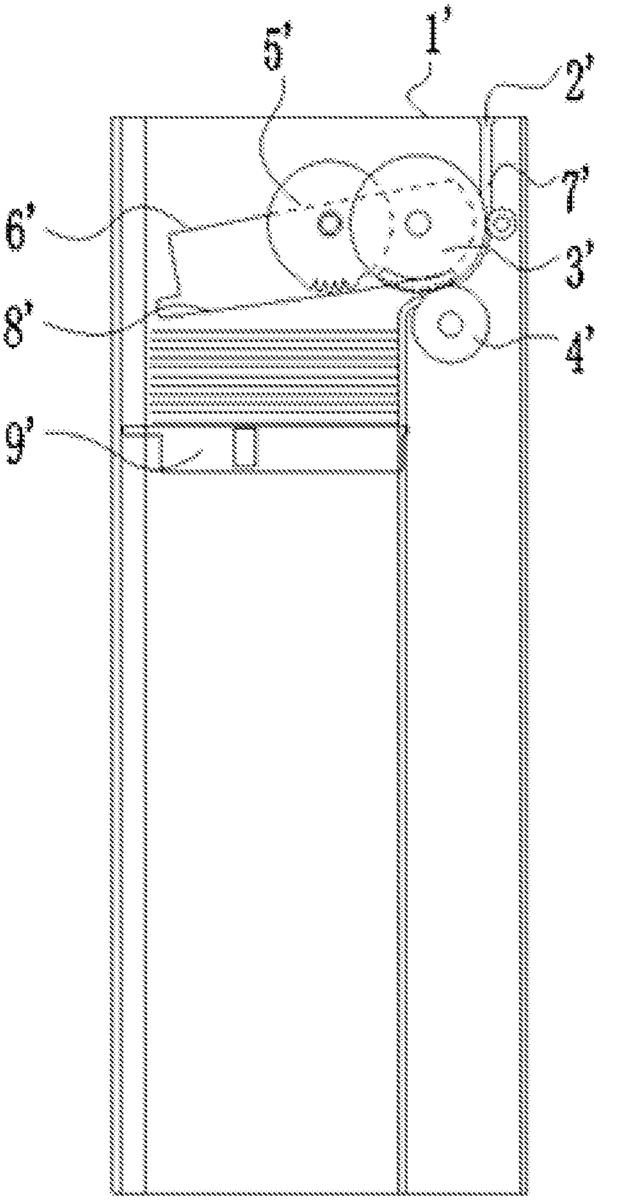
FIG. 1 is a structural view of a banknote stacking and separation apparatus in the related art.

As shown in FIG. 1, a banknote stacking and separation apparatus in the related art includes a frame 1', an opening 2', a feeding roller 3', a gate roller 4', a pickuping roller 5', a guiding plate 6', a conveying channel 7', a banknote storage chamber 8' and a supporting plate 9'; the opening 2' is arranged in the upper part of the frame 1', and the banknote storage chamber 8' is located inside the frame 1'; the feeding roller 3' and the gate roller 4' are located on one side of the banknote storage chamber 8' adjacent to the opening 2', and they are oppositely arranged to form an inlet/outlet (not shown in the figure) for banknotes entering and exiting the banknote storage chamber 8'; the pickuping roller 5' and the guiding plate 6' are located inside the banknote storage chamber 8' and on the downstream side of the inlet/outlet along the direction of banknotes entering the banknote storage chamber 8'; the guiding plate 6' is adjustable relative to the inlet/outlet, and has a guiding position and a lifting position; the conveying channel 7' is connected between the opening 2' and the inlet/outlet, and the supporting plate 9' is located in the banknote storage chamber 8'. The guiding plate 6' is at the guiding position during banknote input to shield from the pickuping roller 5' and guide banknotes to be stacked on the supporting plate 9' without contacting with the pickuping roller 5'; during banknote output, the supporting plate 9' approaches the guiding plate 6', and the banknotes on the supporting plate 9' push the guiding plate 6' to rotate to the lifting position to expose the pickuping roller 5', and the supporting plate 9' presses the banknotes on the pickuping roller 5' at set pressure; at this time, the pickuping roller 5' rotates to drive the banknotes in contact with the pickuping roller 5' to move towards the feeding roller 3', and the feeding roller 3' and the gate roller 4' drive a single banknote to pass through the conveying channel 7'; and then, the banknote is output through the opening 2'. The lifting of the guiding plate 6' in the banknote stacking and separation apparatus is realized by the drive of the supporting plate 9'; namely, when the supporting plate 9' carrying banknotes moves towards the guiding plate 6', after the banknotes on the supporting plate 9' contact the guiding plate 6', the guiding plate 6' is lifted to expose the pickuping roller 5' to contact with the banknotes; at this time, the pickuping roller 5' rotates to drive the banknotes to move towards the inlet/outlet; the feeding roller 3' rotates, while the gate roller 4' does not rotate or rotates reversely, ensuring that only a single banknote enters the conveying channel 7' from the inlet/outlet, and is finally output through the opening 2'. Since there are multiple parts on the guiding plate 6', the guiding plate 6' is heavy; when the supporting plate 9' drives the guiding plate 6' to lift, the guiding plate 6' presses the banknotes and affects the pickuping roller 5' conveying banknotes towards the feeding roller 3', resulting in poor reliability of separating and outputting banknotes by the banknote stacking and separation apparatus.

Figure 3:
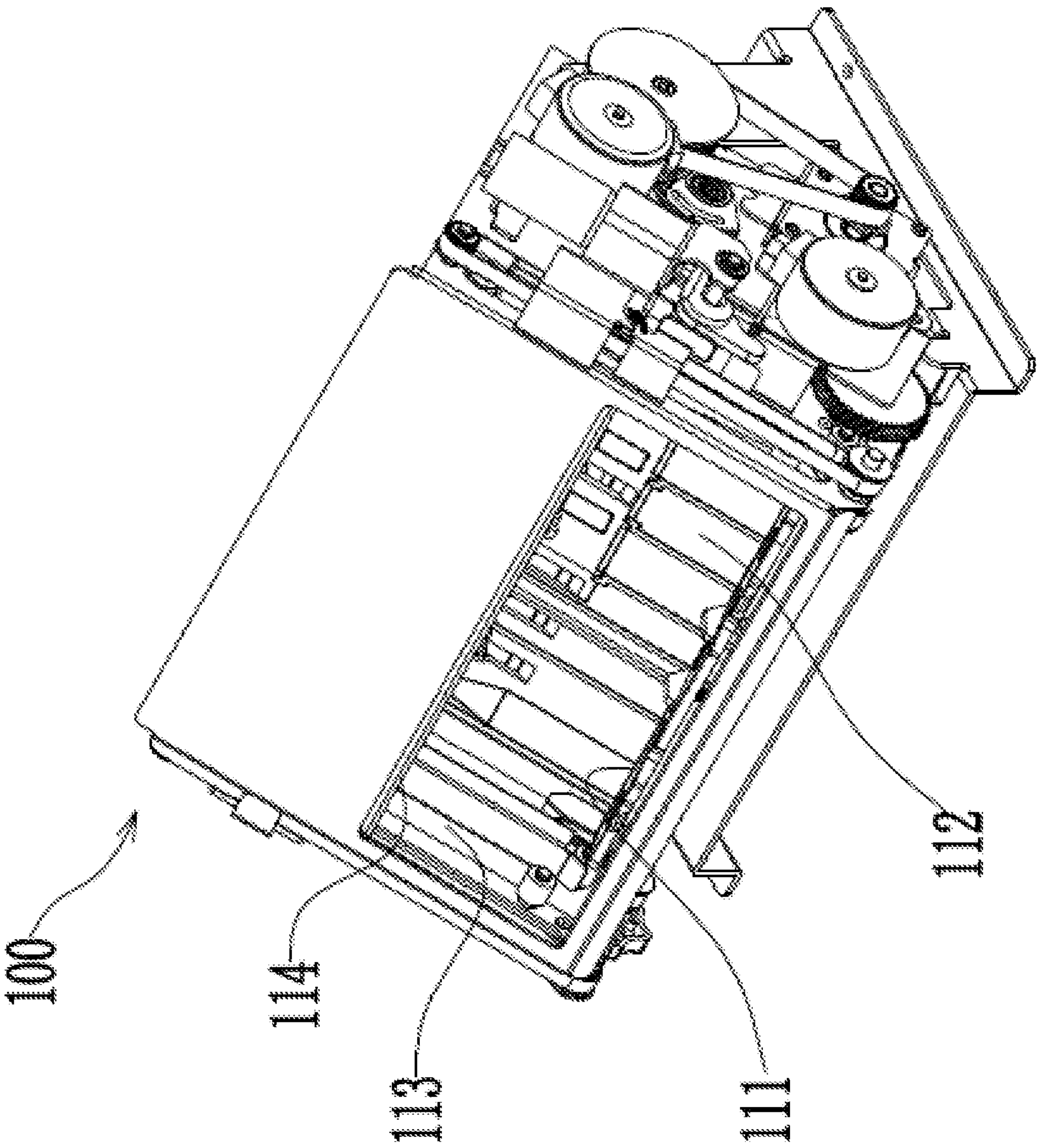
FIG. 3 is a structural view of a banknote stacking and separation apparatus according to an embodiment of the present disclosure.
Figure 4:
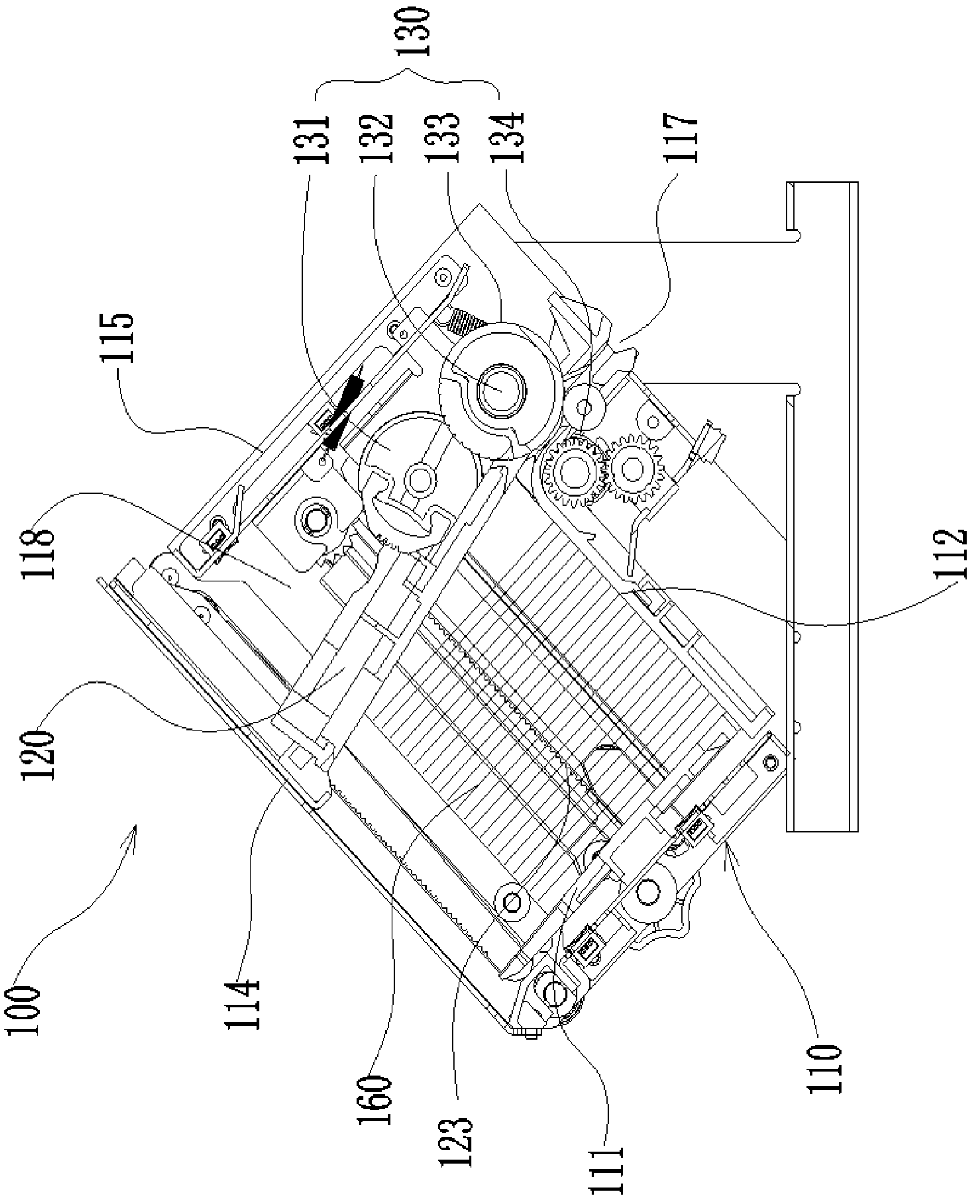
FIG. 4 is a structural section view of a banknote stacking and separation apparatus according to an embodiment of the present disclosure.

FIG. 3 is a structural view of a banknote stacking and separation apparatus 100 according to an embodiment of the present disclosure. FIG. 4 is a structural section view of a banknote stacking and separation apparatus 100 according to an embodiment of the present disclosure; as shown in FIG. 3 and FIG. 4, an embodiment of the present disclosure provides a banknote stacking and separation apparatus 100, including a frame 110 provided with a banknote accommodating space 118, and a guiding plate 120 located in the banknote accommodating space 118 and pivoted with the frame 110. In an embodiment, the frame 110 is provided with an inlet and outlet 117 connected with the banknote accommodating space 118; a pickuping roller 131, a feeding roller 133 and a gate roller 134 are provided in the upper part of the banknote accommodating space 118; the feeding roller 133 and the gate roller 134 are oppositely arranged; the pickuping roller 131 is configured to drive the banknotes 160 in the banknote accommodating space 118 to move towards the feeding roller 133; the feeding roller 133 is matched with the gate roller 134 and configured to drive a single banknote 160 to be output from the inlet and outlet 117, and further configured to drive the banknotes 160 entering from the inlet and outlet 117 into the banknote accommodating space 118.

In an embodiment, the banknote stacking and separation apparatus 100 further includes a supporting plate 111 located in the banknote accommodating space 118; the supporting plate 111 is movable in a direction close to or away from the guiding plate 120.

Figure 7:
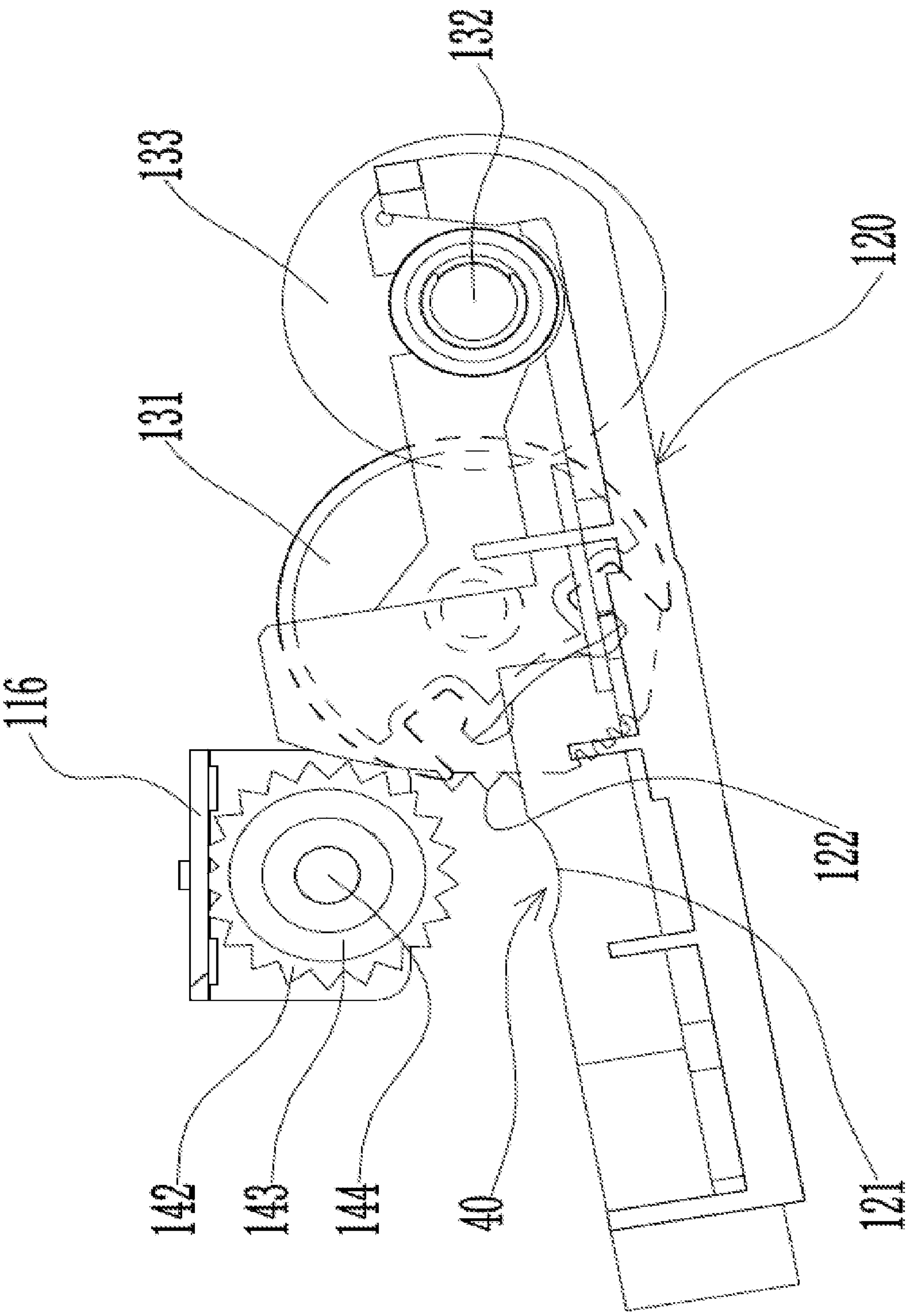
FIG. 7 is a structural view of a guiding plate at a guiding position according to an embodiment of the present disclosure.
Figure 10:
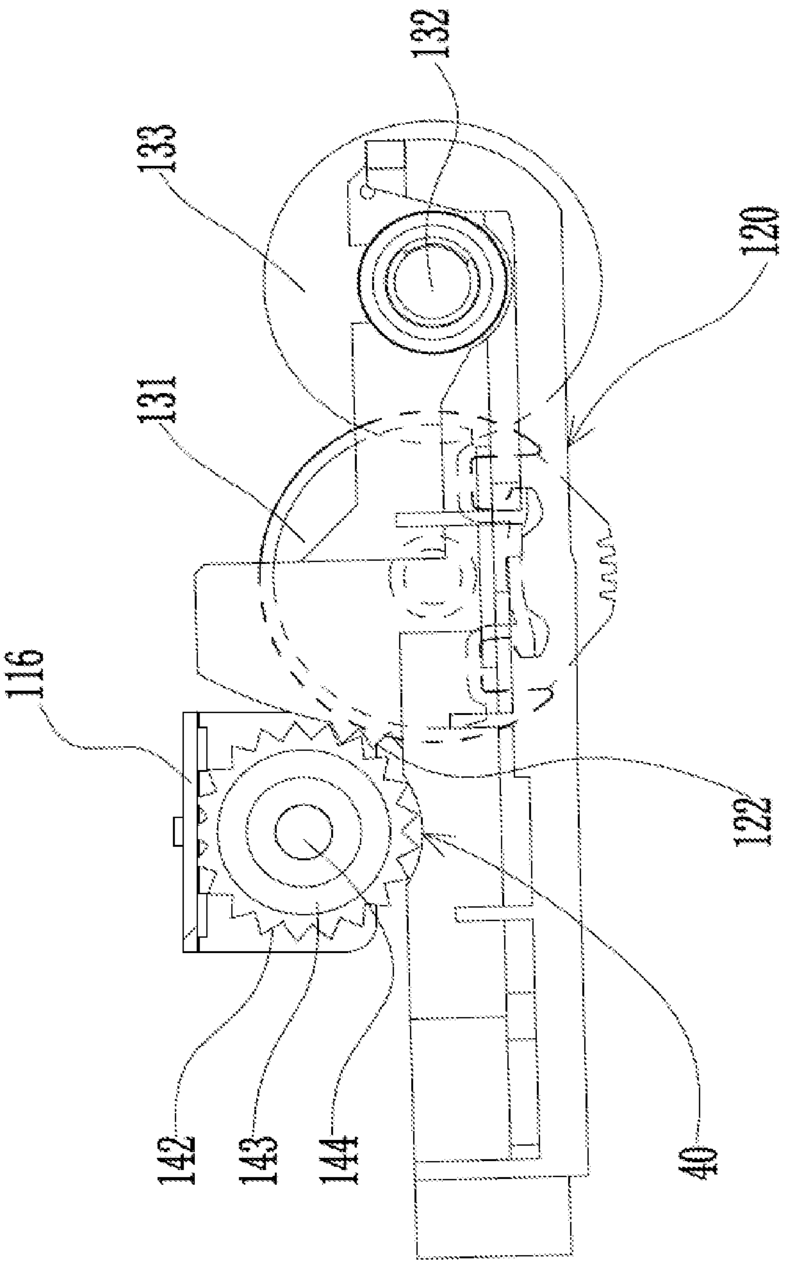
FIG. 10 is a structural view of a guiding plate at a lifting position according to an embodiment of the present disclosure.

FIG. 7 is a structural view of a guiding plate 120 at a guiding position according to an embodiment of the present disclosure. FIG. 10 is a structural view of a guiding plate 120 at a lifting position according to an embodiment of the present disclosure; with continuous reference to FIG. 3 and FIG. 4, as well as in accordance with FIG. 7 and FIG. 10, in the embodiment, a first end of the guiding plate 120 is adjacent to the feeding roller 133, and the first end of the guiding plate 120 is pivoted with the frame 110; a second end of the guiding plate 120 can rotate around the pivot axis between a guiding position and a lifting position. When the guiding plate 120 is at the guiding position, the guiding plate 120 is configured to shield the pickuping roller 131 and guide the banknotes 160 input by the feeding roller 133 and the gate roller 134 to enter the banknote accommodating space 118 and be stacked on the supporting plate 111; the guiding plate 120 is also configured to expose the pickuping roller 131 when the guiding plate 120 is at the lifting position; at this time, the supporting plate 111 moves towards the guiding plate 120 and presses the banknotes 160 against the pickuping roller 131, which rotates to drive the banknotes 160 in contact with the pickuping roller 131 to move towards the feeding roller 133 and the gate roller 134.

In an embodiment, the banknote stacking and separation apparatus 100 further includes a guiding plate driving mechanism 140; the guiding plate driving mechanism 140 is configured to drive the guiding plate 120 to rotate from a guiding position to a lifting position; as shown in FIG. 7, when the guiding plate 120 is at the guiding position, the guiding plate 120 shields the pickuping roller 131. As shown in FIG. 10, when the guiding plate 120 is at the lifting position, the guiding plate 120 exposes the pickuping roller 131.

The working process of the banknote stacking and separation apparatus 100 is as follows: during banknote input, the guiding plate 120 is at the guiding position, shielding the pickuping roller 131, preventing a banknote 160 from contacting with the pickuping roller 131, and then the feeding roller 133 and the gate roller 134 rotate, driving the banknote 160 input through the inlet and outlet 117 into the banknote accommodating space 118, and the guiding plate 120 guides the banknote 160 to enter the banknote accommodating space 118 and be stacked on the supporting plate 111 to complete the banknote input; during banknote output, the guiding plate driving mechanism 140 drives the guiding plate 120 to rotate from the guiding position to the lifting position to expose the pickuping roller 131, the supporting plate 120 carrying the banknote 160 moves towards the guiding plate 120, and presses the banknote 160 against the pickuping roller 131, the pickuping roller 131 drives the banknote 160 to move towards the feeding roller 133, the single banknote 160 output from the banknote inlet and outlet 117 under the joint action of the feeding roller 133 and the gate roller 134 to complete the banknote output.

For the banknote stacking and separation apparatus 100, the guiding plate driving mechanism 140 is arranged to drive the guiding plate 120 to rotate and lift, so that the passive rotation of the guiding plate 120 is changed into active rotation, which avoids the problem that the guiding plate 120 presses the banknote 160, affecting the pickuping roller 131 outputting the banknote 160 and corrects the defect that it is difficult to expose the pickuping roller 131 due to difficulties in lifting the guiding plate 120 in the past, improving the lifting efficiency and the lifting reliability of the guiding plate 120. Furthermore, the active lifting of the guiding plate 120 greatly reduces the reaction force borne by the supporting plate 111, reduces the load on the supporting plate 111, and prolongs the service life of the supporting plate 111. In addition, the banknote stacking and separation apparatus 100 is simple in structure and easy to achieve, and it is of great significance for improving the working reliability of the cash recycling and handling device.

With continuous reference to FIG. 3 and FIG. 4, in the embodiment, the frame 110 includes two side walls 113 arranged oppositely, in parallel and at interval, a base plate 112 and a top wall 115 both vertically connected between the two side walls 113. The base plate 112, the supporting plate 111, the top wall 115 and the two side walls 113 constitute the banknote accommodating space 118.

In addition, the banknote stacking and separation apparatus 100 further includes a shutter 114. In an embodiment, the shutter 114 can open or close the banknote accommodating space 118 under the action of a shutter driving mechanism, so that banknote 160 in the banknote accommodating space 118 can be taken out or be placed into the banknote accommodating space 118.

Please continue to refer to FIG. 4. In the embodiment, the feeding roller 133 is pivoted with the two side walls 113 through a rotating shaft 132.

In the embodiment, the banknote stacking and separation apparatus 100 may further include an elastic element 123 for resetting the guiding plate 120. In an embodiment, the elastic element 123 is connected between the guiding plate 120 and the frame 110; under the action of the elastic element 123, the guiding plate 120 always has a tendency to move to the guiding position (as shown in FIG. 4).

In the embodiment, the guiding plate 120 is socketed on the rotating shaft 132, and rotates to lift up or put down around the rotating shaft 132. In addition, the pickuping roller 131, the rotating shaft 132, the feeding roller 133 and the gate roller 134 constitute a conveying mechanism 130.

Figure 5:
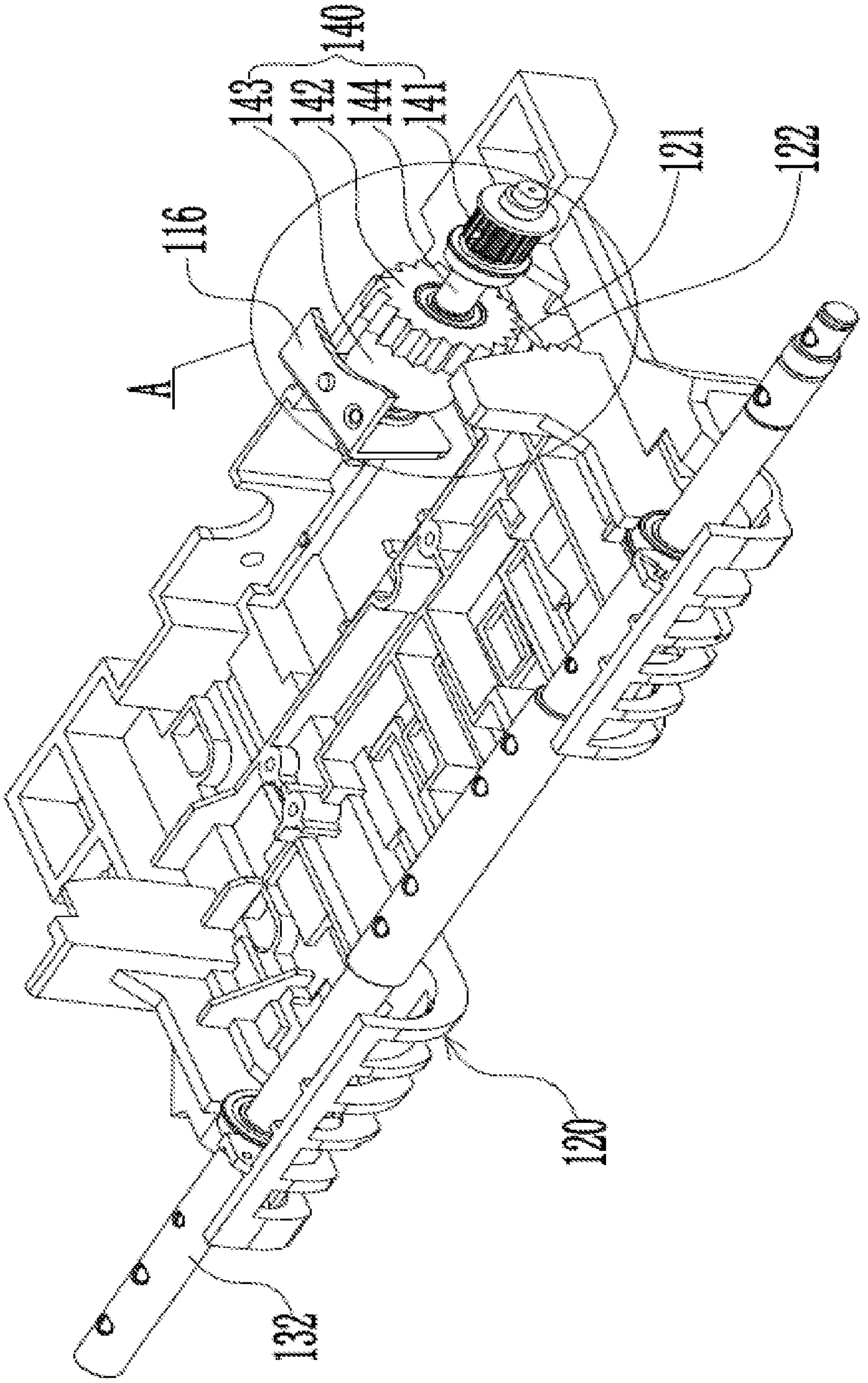
FIG. 5 is a structural view of a guiding plate and a guiding plate driving mechanism from a first angle of view according to an embodiment of the present disclosure.
Figure 6:
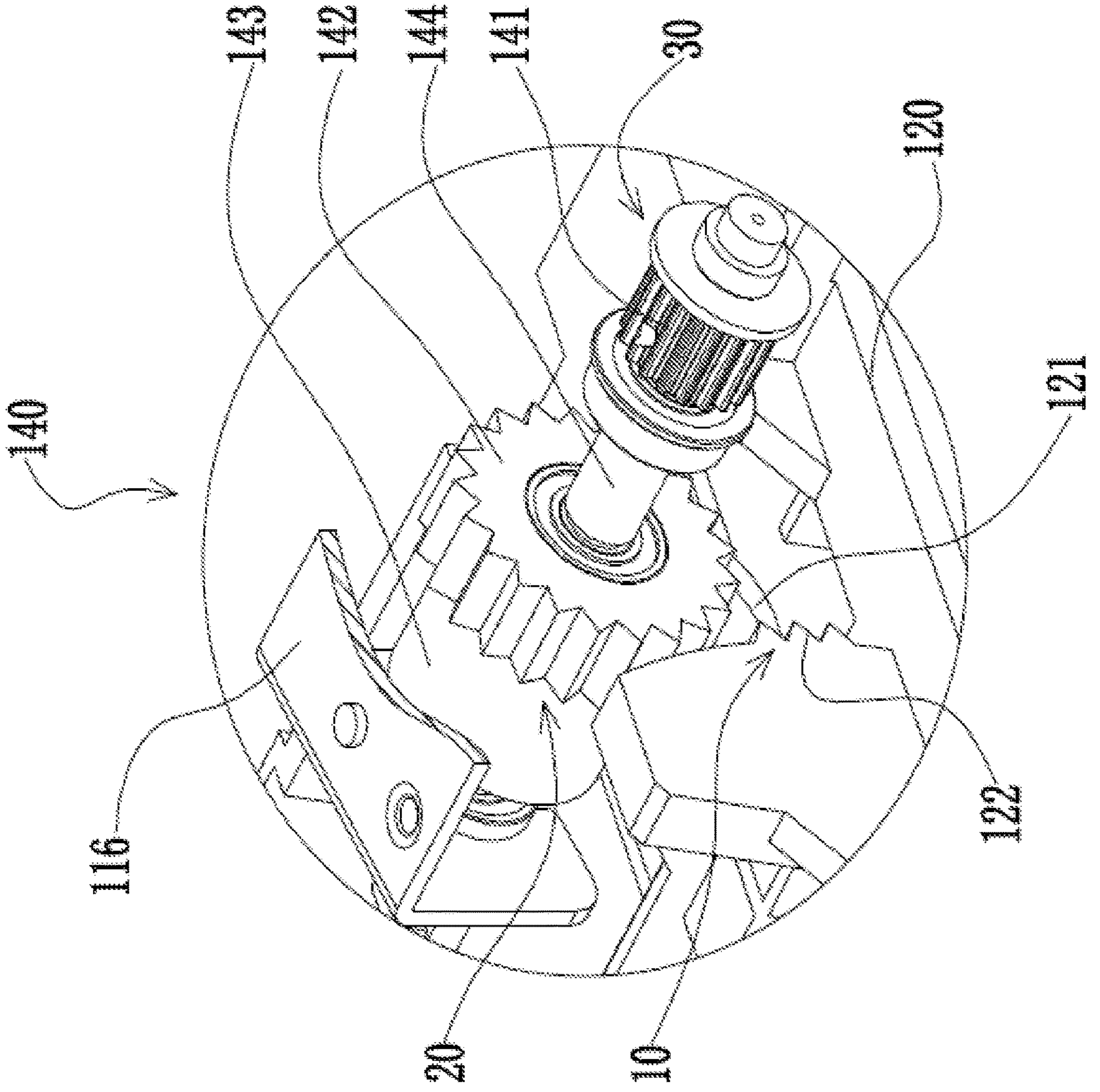
FIG. 6 is a partial enlarged view of part A in FIG. 5.

FIG. 5 is a structural view of a guiding plate 120 and a guiding plate driving mechanism 140 from a first angle of view according to an embodiment of the present disclosure, and FIG. 6 is a partial enlarged view of A in FIG. 5; as shown in FIG. 5 and FIG. 6, in the embodiment, the guiding plate driving mechanism 140 includes a first transmission part 10, a second transmission part 20 and a driving assembly 30; the first transmission part 10 is fixedly arranged on the guiding plate 120 and is arranged at interval with the pivot axis (i.e., the rotating shaft 132) between the guiding plate 120 and the frame 110; the second transmission part 20 and the driving assembly 30 are both installed on the frame 110; the driving assembly 30 is in transmission connection with the second transmission part 20. The first transmission part 10 is configured to be separated from the second transmission part 20 when the guiding plate 120 is at the guiding position, and the first transmission part 10 is further configured to be connected with the second transmission part 20 when the guiding plate 120 is at the lifting position. During the guiding plate 120 rotates from the guiding position to the lifting position, the driving transmission part 10 connected with the second transmission part 20, the driving assembly 30 drives the guide plate 120 to continue to rotate to the lifting position.

In an embodiment, no matter if the guide plate 120 is in the guide position or the lifting position, the second transmission part 20 is always connected with the first transmission part 10. When the guide plate 120 is rotated from the guide position to the lifting position, the driving assembly 30 drives the guide plate 120 to continue to rotate to the lifting position.

For the banknote stacking and separation apparatus 100, the first transmission part 10 and the second transmission part 20 are connected during the rotation of the guiding plate 120, so that the driving force of the driving assembly 30 is transmitted to the guiding plate 120, and then the guiding plate 120 is actively lifted to expose the pickuping roller 131. This active lifting mode avoids the problem that the guiding plate 120 presses the banknote 160, affecting the pickuping roller 131 driving the banknote 160 output, and effectively corrects the defect that it is difficult to passively lift the guiding plate 120 in the past.

Figure 8:
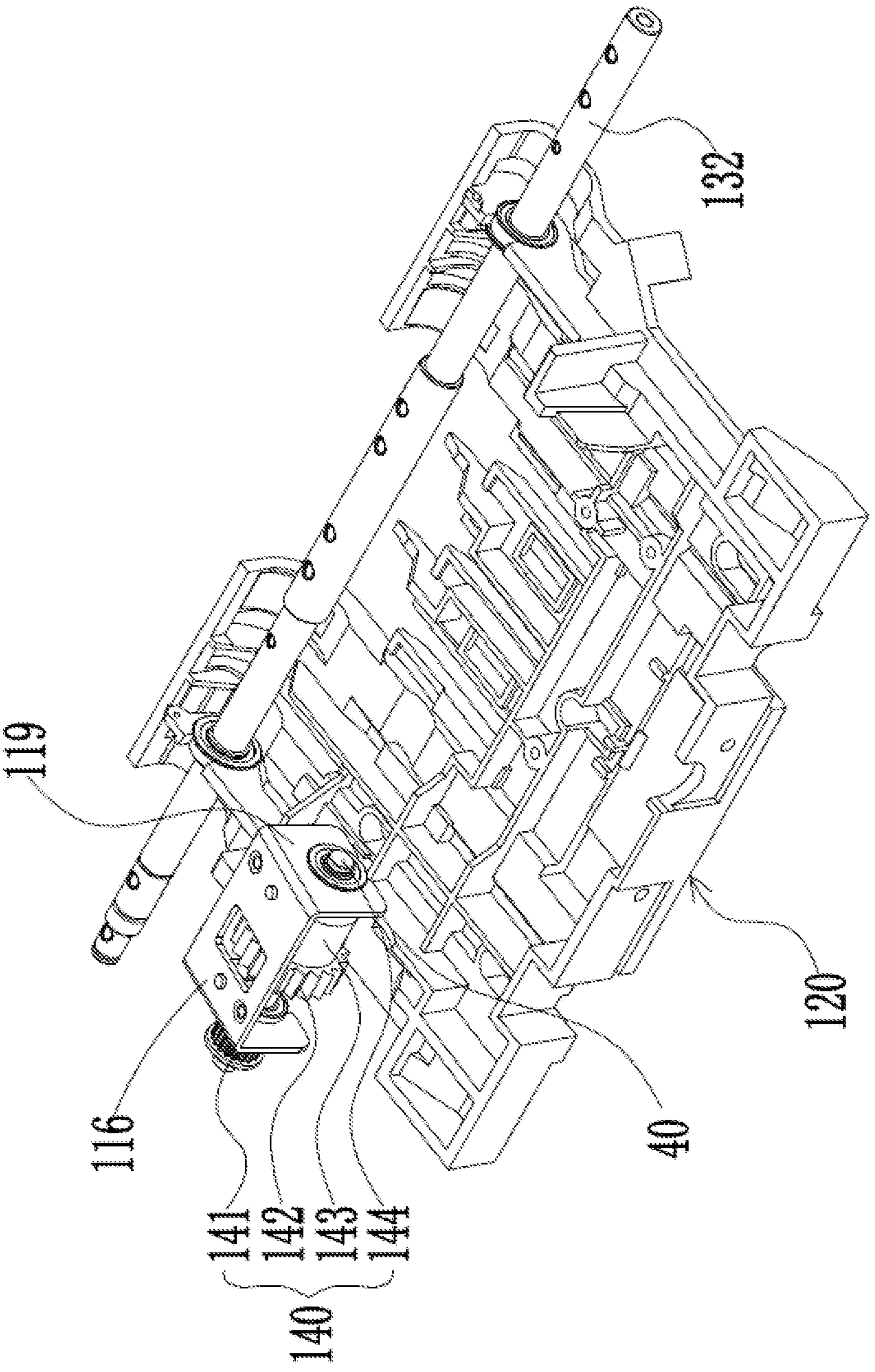
FIG. 8 is a structural view of a guiding plate and a guiding plate driving mechanism from a second angle of view according to an embodiment of the present disclosure.

FIG. 8 is a structural view of a guiding plate 120 and a guiding plate driving mechanism 140 from a second angle of view according to an embodiment of the present disclosure;

as shown in FIG. 5-FIG. 8, in the embodiment, the first transmission part 10 includes a toothed part 122, and the second transmission part 20 includes a guiding gear 142 capable of meshing transmission with the toothed part 122.

When the guiding plate 120 rotates from the guiding position to the lifting position, the guiding gear 142 rotates along the set rotation direction, and the toothed part 122 on the guiding plate 120 will be meshed with the guiding gear 142; under the drive of the guiding gear 142, the active lifting of the guiding plate 120 is realized. When the guiding plate 120 is put down to guide the banknote 160, the guiding gear 142 is driven to rotate in the direction opposite to the set rotation direction; during the rotation, the toothed part 122 will be gradually separated from the guiding gear 142, and the guiding plate 120 will rotate to the guiding position under the action of its own weight or the elastic element 123, thereby the guiding plate 120 is put down.

Figure 9:
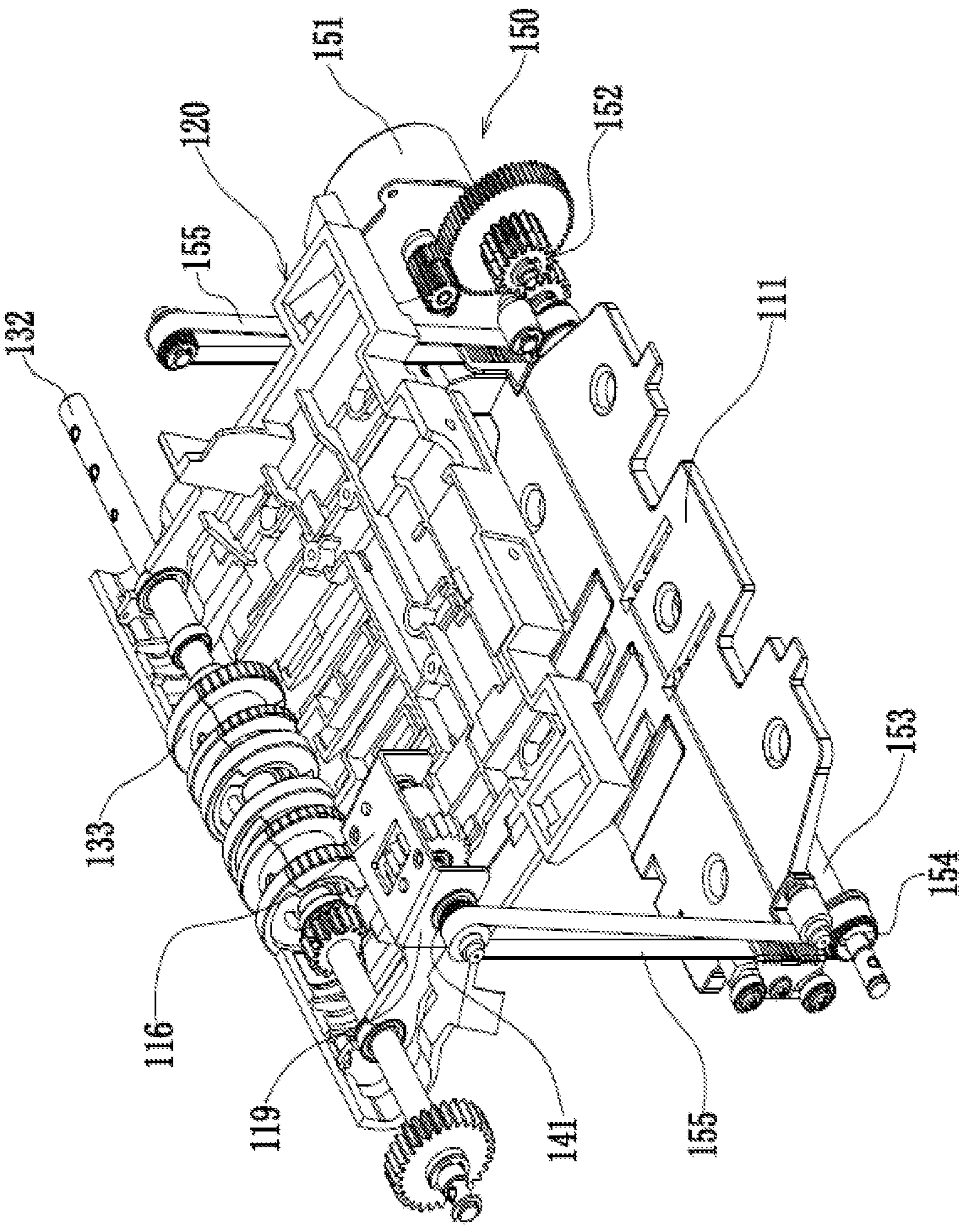
FIG. 9 is a partial structural view of a banknote stacking and separation apparatus according to an embodiment of the present disclosure.

With continuous reference to FIG. 5 and FIG. 6, in the embodiment, the driving assembly 30 may include a first transmission shaft 144 pivoted with the frame 110; the guiding gear 142 is socketed on the first transmission shaft 144 and driven to rotate by the first transmission shaft 144. In addition, FIG. 9 is a partial structural view of a banknote stacking and separation apparatus 100 according to an embodiment of the present disclosure, and it is also a structural view of a guiding plate 120 and a guiding plate driving mechanism 140 from a third angle of view. Please continue to refer to FIG. 9. The banknote stacking and separation apparatus 100 may further include a supporting plate driving mechanism 150, which is configured to drive the supporting plate 111 to move in a direction close to or away from the pickuping roller 131; the first transmission shaft 144 is in transmission connection with the supporting plate driving mechanism 150 for driving the supporting plate 111 to move.

Based on this arrangement, the movement of the supporting plate 111 and the lifting of the guiding plate 120 are realized by the same motor 151, not only reducing the number of parts and components, but also making the banknote stacking and separation apparatus 100 more integrated according to the embodiment, as well as greatly reducing the cost of the banknote stacking and separation apparatus 100, resulting in a high economic value.

With continuous reference to FIG. 3 and FIG. 4, in the embodiment, the supporting plate 111 is located between the two side walls 113 and is vertically connected with the two side walls 113.

The working process in which the banknote stacking and separation apparatus 100 is configured to lift the guiding plate 120 is as follows: the banknote 160 is placed on the supporting plate 111; when the supporting plate 111 carrying the banknote 160 moves to a place where the banknote 160 contacts the guiding plate 120, the banknote 160 will press the guiding plate 120 and trigger the rotation of the guiding plate 120 in the process of the supporting plate 111 continuing to move; with the rotation of the guiding plate 120, the toothed part 122 meshed with the guiding gear 142, the guiding plate 120 continues to rotate to the lifting position driven by the guiding gear 142, exposing the pickuping roller 131; the guiding plate 120 is separated from the banknote 160 on the supporting plate 111; therefore, the act of the pickuping roller 131 conveying banknotes towards the feeding roller 133 will not be affected by the guiding plate120.

As shown in FIG. 9, in the embodiment, the supporting plate driving mechanism 150 may include a second transmission shaft 153 arranged on the frame 110, a driving pulley 154 socketed on the second transmission shaft 153, a driven pulley 141 fixedly socketed on the first transmission shaft 144, a motor 151, and a belt 155 socketed on the driving pulley 154 and the driven pulley 141. The motor 151 is configured to drive the driving pulley 154 to rotate; the supporting plate 111 is fixedly connected with the belt 155.

The power transmission path of the banknote stacking and separation apparatus 100 is as follows: the motor 151 works and outputs power to the second transmission shaft 153 through the transmission gear set 152 to drive the driving pulley 154 to rotate, and then the driving pulley 154 drives the driven pulley 141 to rotate through the belt 155, so that the first transmission shaft 144 rotates and then drives the guiding gear 142 to rotate; and then, the guiding plate 120 is lifted by the meshing transmission between the guiding gear 142 and the toothed part 122.

In the embodiment, the power transmission from the supporting plate driving mechanism 150 to the guiding plate driving mechanism 140 can be realized through the driving pulley 154, the driven pulley 141 and the belt 155 moving synchronously between them mentioned above; however, other structures can also be adopted such as the chain transmission; in an embodiment, the driving sprocket is fixedly socketed on the second transmission shaft 153, and the driven sprocket is fixedly socketed on the first transmission shaft 144; a chain moving synchronously is arranged between the driving sprocket and the driven sprocket, and the first transmission shaft 144 can be driven by the transmission of the chain. Therefore, as long as the transmission connection between the supporting plate driving mechanism 150 and the guiding plate driving mechanism 140 can be realized, the power transmission structures involved is acceptable.

With continuous reference to FIG. 5-FIG. 9, in the embodiment, the guiding plate driving mechanism 140 may further include a U-shaped mounting frame 116 fixedly connected with the frame 110; in an embodiment, the U-shaped mounting frame 116 includes two side plates 119 arranged in parallel to each other and at interval; two ends of the first transmission shaft 144 are respectively supported by the two side plates 119.

The U-shaped mounting frame 116 makes the guiding plate driving mechanism 140 mounted reliably on the frame 110 and ensures the working stability of the guiding plate driving mechanism 140. In the embodiment, the U-shaped mounting frame 116 is fixedly connected with the top wall 115 of the banknote stacking and separation apparatus 100. In addition, the U-shaped mounting frame 116 can be detachably connected to the top wall 115 for facilitate maintenance.

With continuous reference to FIG. 5-FIG. 8, in the embodiment, the guiding plate driving mechanism 140 may further include a torque limiter 143; in an embodiment, the torque limiter 143 is arranged between the guiding gear 142 and the first transmission shaft 144; the driving end of the torque limiter 143 is fixedly connected with the first transmission shaft 144, and the transmission end is connected with the guiding gear 142; when the resistance of the guiding gear 142 is greater than the rated load of the torque limiter 143, the driving end idles, but the transmission end does not rotate; thereby, the guiding gear 142 slides relative to the first transmission shaft 144, thus breaking the transmission connection between the guiding gear 142 and the first transmission shaft 144.

With continuous reference to FIG. 7, FIG. 9 and FIG. 10, in the embodiment, the guiding plate 120 can also be provided with a limiting slot 40, which is configured to fit with the guiding gear 142 to prevent the guiding gear 142 from rotating when the guiding plate 120 is at the lifting position; Specifically the guiding gear 142 can be stuck in the limiting slot 40, which applies resistance to guiding gear 142 to prevents the guiding gear 142 from rotating; when the resistance of the guiding gear 142 is greater than the rated load of the torque limiter 143, the torque limiter 143 is slides relative to the first transmission shaft 144; the first transmission shaft 144 continues to rotate and the guiding gear 142 does not move, so that the working of the supporting plate driving mechanism 150 will not be affected. In addition, the limiting slot 40 also can prevent the guiding plate 120 from accidentally falling.

As shown in FIG. 7, in the embodiment, the limiting slot 40 may include an arc-shaped limiting slot 121; the arc shape of the arc-shaped limiting slot 121 matches with the profile of the guiding gear 142. The arc-shaped surface of the arc-shaped limiting slot 121 increases the contact area between the arc-shaped limiting slot 121 and the guiding gear 142, and avoids the damage to the teeth of the guiding gear 142 caused by impact stress to a certain extent, thus ensuring the working reliability of the guiding plate driving mechanism 140.

The torque limiter 143 avoids the impact vibration of the motor 151 caused by the guiding plate 120 rotating to the right place to a certain extent, and realizes overload protection of the motor 151, thereby prolonging the working life of the motor 151 and further ensuring the working reliability of the banknote stacking and separation apparatus 100 according to the embodiment.

Figure 2:
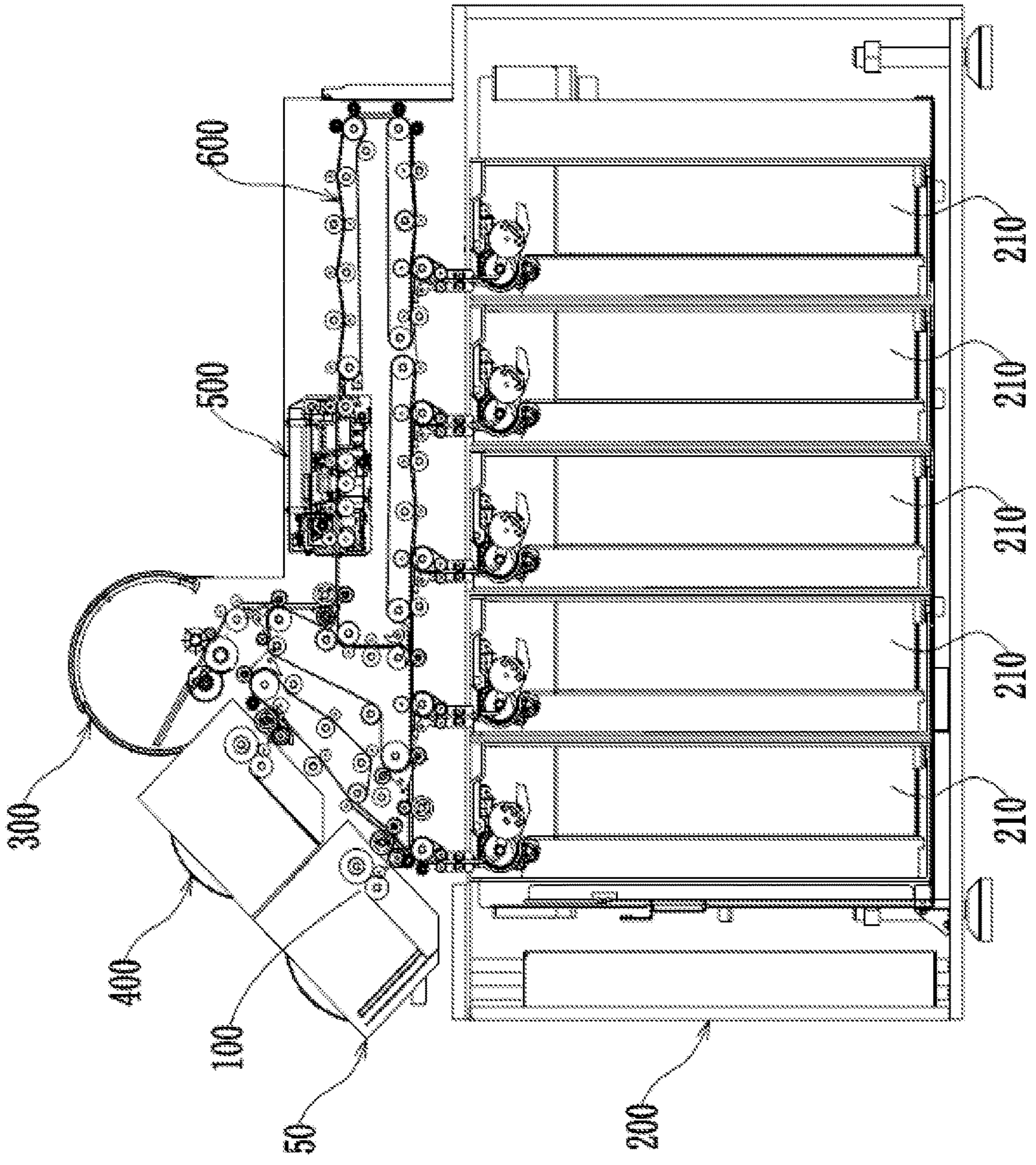
FIG. 2 is a structural view of a cash recycling and handling device according to an embodiment of the present disclosure.

FIG. 2 is a structural view of a cash recycling and handling device according to an embodiment of the present disclosure; as shown in FIG. 2, the embodiment further provides a cash recycling and handling device including a banknote input device 300, a banknote output device 400, a temporary storage device 50, an identification device 500, multiple cash boxes 210, and a banknote conveying device 600 connected between the multiple devices and cash boxes 210 mentioned above. In the embodiment, the temporary storage device 50 includes the above-mentioned banknote stacking and separation apparatus 100.

By setting the above-mentioned banknote stacking and separation apparatus 100 in the cash recycling and handling device, the banknotes 160 in the process of depositing and withdrawing money by a user can be temporarily stored. Accordingly, the cash recycling and handling device has all the advantages of the above-mentioned banknote stacking and separation apparatus 100, and those advantages will not be described in detail here.

The basic working process of the cash recycling and handling device is as follows: during banknote input, the banknotes 160 enter from the banknote input device 300; after being identified by the identification device 500, the qualified banknotes 160 are stored in one or more cash boxes 210 of the safe cabinet 200 under the action of the banknote conveying device 600, and the unqualified banknotes 160 are conveyed to the banknote stacking and separation apparatus 100; during banknote output, the banknotes 160 enter the banknote conveying device 600 from the cash boxes 210, and the qualified banknotes 160 are output by the banknote output device 400 with the aid of the banknote conveying device 600.

What is claimed is:

1. A banknote stacking and separation apparatus, comprising a frame provided with a banknote accommodating space; wherein a pickuping roller, a feeding roller and a gate roller are provided in an upper part of the banknote accommodating space; and the feeding roller and the gate roller are oppositely arranged;

the banknote stacking and separation apparatus further comprises a guiding plate and a guiding plate driving mechanism; wherein the guiding plate is located in the banknote accommodating space and pivoted with the frame, and the guiding plate driving mechanism is configured to drive the guiding plate to rotate from a guiding position to a lifting position; wherein, the guiding plate is configured to, in condition that the guiding plate is at the guiding position, shield the pickuping roller, and the guiding plate is also configured to, in condition that the guiding plate is at the lifting position, expose the pickuping roller;

wherein the guiding plate driving mechanism comprises a first transmission part, a second transmission part and a driving assembly; wherein, the first transmission part is fixed on the guiding plate and is arranged at interval with a pivot axis between the guiding plate and the frame; the second transmission part and the driving assembly are both installed on the frame; and the driving assembly is in transmission connection with the second transmission part; and the first transmission part is configured to, in condition that the guiding plate is at the guiding position, be separated from the second transmission part, and the first transmission part is further configured to, in condition that the guiding plate is at the lifting position, be connected with the second transmission part.

2. The apparatus according to claim 1, wherein the first transmission part comprises a toothed part, and the second transmission part comprises a guiding gear capable of meshing transmission with the toothed part.

3. The apparatus according to claim 2, wherein the driving assembly comprises a first transmission shaft pivoted with the frame, and the guiding gear is socketed on the first transmission shaft and driven by the first transmission shaft to rotate.

4. The apparatus according to claim 3, further comprising a supporting plate in the banknote accommodating space and a supporting plate driving mechanism; wherein the supporting plate is configured to stack banknotes; and the supporting plate driving mechanism is configured to drive the supporting plate to move; and the first transmission shaft is in transmission connection with the supporting plate driving mechanism.

5. The apparatus according to claim 4, wherein the supporting plate driving mechanism comprises a second transmission shaft arranged on the frame, a driving pulley socketed on the second transmission shaft, a driven pulley fixedly socketed on the first transmission shaft, a belt socketed on the driving pulley and the driven pulley, and a motor, the motor is configured to drive the driving pulley to rotate; and the supporting plate is fixedly connected with the belt.

6. The apparatus according to claim 3, wherein the guiding plate driving mechanism further comprises a U-shaped mounting frame fixedly connected with the frame; the U-shaped mounting frame comprises two side plates arranged in parallel to each other and at interval, and two ends of the first transmission shaft are respectively supported by the two side plates.

7. The apparatus according to claim 3, wherein the guiding plate driving mechanism further comprises a torque limiter; and the torque limiter is arranged between the guiding gear and the first transmission shaft.

8. The apparatus according to claim 4, wherein the guiding plate driving mechanism further comprises a U-shaped mounting frame fixedly connected with the frame; the U-shaped mounting frame comprises two side plates arranged in parallel to each other and at interval, and two ends of the first transmission shaft are respectively supported by the two side plates.

9. The apparatus according to claim 4, wherein the guiding plate driving mechanism further comprises a torque limiter; and the torque limiter is arranged between the guiding gear and the first transmission shaft.

10. The apparatus according to claim 2, wherein the guiding plate is provided with a limiting slot; and the limiting slot is configured to, in condition that the guiding plate is at the lifting position, fit with the guiding gear to prevent the guiding gear from rotating.

11. The apparatus according to claim 10, wherein the limiting slot comprises an arc-shaped limiting slot; and the arc shape of the arc-shaped limiting slot fits with the profile of the guiding gear.

12. The apparatus according to claim 1, wherein the guiding plate is socketed on a rotating shaft of the feeding roller and rotatable around the rotating shaft between the lifting position and the guiding position.

13. A cash recycling and handling device, comprising a banknote stacking and separation apparatus, wherein the banknote stacking and separation apparatus comprises a frame provided with a banknote accommodating space; wherein a pickuping roller, a feeding roller and a gate roller are provided in an upper part of the banknote accommodating space; and the feeding roller and the gate roller are oppositely arranged;

the banknote stacking and separation apparatus further comprises a guiding plate and a guiding plate driving mechanism; wherein the guiding plate is located in the banknote accommodating space and pivoted with the frame, and the guiding plate driving mechanism is configured to drive the guiding plate to rotate from a guiding position to a lifting position; wherein, the guiding plate is configured to, in condition that the guiding plate is at the guiding position, shield the pickuping roller, and the guiding plate is also configured to, in condition that the guiding plate is at the lifting position, expose the pickuping roller;

wherein the guiding plate driving mechanism comprises a first transmission part, a second transmission part and a driving assembly; wherein, the first transmission part is fixed on the guiding plate and is arranged at interval with a pivot axis between the guiding plate and the frame; the second transmission part and the driving assembly are both installed on the frame; and the driving assembly is in transmission connection with the second transmission part; and the first transmission part is configured to, in condition that the guiding plate is at the guiding position, be separated from the second transmission part, and the first transmission part is further configured to, in condition that the guiding plate is at the lifting position, be connected with the second transmission part.

14. The device according to claim 13, wherein the first transmission part comprises a toothed part, and the second transmission part comprises a guiding gear capable of meshing transmission with the toothed part.

15. The device according to claim 14, wherein the driving assembly comprises a first transmission shaft pivoted with the frame, and the guiding gear is socketed on the first transmission shaft and driven by the first transmission shaft to rotate.

16. The device according to claim 15, further comprising a supporting plate in the banknote accommodating space and a supporting plate driving mechanism; wherein the supporting plate is configured to stack banknotes; and the supporting plate driving mechanism is configured to drive the supporting plate to move; and the first transmission shaft is in transmission connection with the supporting plate driving mechanism.

17. The device according to claim 16, wherein the supporting plate driving mechanism comprises a second transmission shaft arranged on the frame, a driving pulley socketed on the second transmission shaft, a driven pulley fixedly socketed on the first transmission shaft, a belt socketed on the driving pulley and the driven pulley, and a motor, the motor is configured to drive the driving pulley to rotate; and the supporting plate is fixedly connected with the belt.

18. The device according to claim 16, wherein the guiding plate driving mechanism further comprises a U-shaped mounting frame fixedly connected with the frame; the U-shaped mounting frame comprises two side plates arranged in parallel to each other and at interval, and two ends of the first transmission shaft are respectively supported by the two side plates.

19. The device according to claim 16, wherein the guiding plate driving mechanism further comprises a torque limiter; and the torque limiter is arranged between the guiding gear and the first transmission shaft.

20. A banknote stacking and separation apparatus, comprising a frame provided with a banknote accommodating space; wherein a pickuping roller, a feeding roller and a gate roller are provided in an upper part of the banknote accommodating space; and the feeding roller and the gate roller are oppositely arranged;

the banknote stacking and separation apparatus further comprises a guiding plate and a guiding plate driving mechanism; wherein the guiding plate is located in the banknote accommodating space and pivoted with the frame, and the guiding plate driving mechanism is configured to drive the guiding plate to rotate from a guiding position to a lifting position; wherein, the guiding plate is configured to, in condition that the guiding plate is at the guiding position, shield the pickuping roller, and the guiding plate is also configured to, in condition that the guiding plate is at the lifting position, expose the pickuping roller;

wherein the guiding plate driving mechanism comprises a first transmission part, a second transmission part and a driving assembly; wherein, the first transmission part is fixed on the guiding plate and is arranged at interval with a pivot axis between the guiding plate and the frame; the second transmission part and the driving assembly are both installed on the frame; and the driving assembly is in transmission connection with the second transmission part; and the second transmission part is always configured to, no matter the guide plate is at the guide position or the lifting position, be connected with the first transmission part, and the driving assembly is configured to, in condition that the guide plate is rotated from the guide position to the lifting position, drive the guide plate to continue to rotate to the lifting position.

* * * * *